United States Patent
Yue et al.

(10) Patent No.: US 12,348,388 B2
(45) Date of Patent: Jul. 1, 2025

(54) OPERATION AND MAINTENANCE MANAGEMENT METHOD OF NETWORK SLICE SUBNET, APPARATUS, SYSTEM, DEVICE AND MEDIUM

(71) Applicant: ZTE CORPORATION, Shenzhen (CN)

(72) Inventors: Shubin Yue, Shenzhen (CN); Hua Ni, Shenzhen (CN); Yongsheng Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/256,122

(22) PCT Filed: Nov. 22, 2021

(86) PCT No.: PCT/CN2021/132128
§ 371 (c)(1),
(2) Date: Jun. 6, 2023

(87) PCT Pub. No.: WO2022/121671
PCT Pub. Date: Jun. 16, 2022

(65) Prior Publication Data
US 2024/0039807 A1 Feb. 1, 2024

(30) Foreign Application Priority Data
Dec. 7, 2020 (CN) .......................... 202011436423.X (51) Int. Cl.
*G06F 15/173* (2006.01)
*H04L 41/16* (2022.01)
(Continued)

(52) U.S. Cl.
CPC .......... *H04L 41/5009* (2013.01); *H04L 41/16* (2013.01); *H04L 41/40* (2022.05); *H04L 43/091* (2022.05); *H04W 24/02* (2013.01)

(58) Field of Classification Search
CPC ..... H04L 41/5009; H04L 41/16; H04L 41/40; H04L 43/091; H04W 24/02
See application file for complete search history.

(56) References Cited

U.S. PATENT DOCUMENTS

2018/0332485 A1 11/2018 Senarath et al.
2019/0021010 A1* 1/2019 Senarath ............... H04W 16/10
(Continued)

FOREIGN PATENT DOCUMENTS

CN 109660379 A 4/2019

OTHER PUBLICATIONS

International Search Report and Written Opinion issued in International Application No. PCT/CN2021/132128; mailed Feb. 11, 2022; 14 pgs.
(Continued)

*Primary Examiner* — Padma Mundur
(74) *Attorney, Agent, or Firm* — HAUPTMAN HAM, LLP (57) ABSTRACT

The embodiments of the present application relate to communication technology field, and discloses an operation and maintenance management method of a network slice subnet, including: obtaining a performance analysis result of each network function (NF) in the network slice subnet, wherein the performance analysis result is obtained by an analytical model in the NF, and the analytical model is obtained by multiple NFs and a common node based on federated learning; and performing operation and maintenance management on the network slice subnet based on the performance analysis result. The embodiments of the present
(Continued)

application also discloses an operation and maintenance management apparatus of a network slice subnet, a system, a device and a medium.

6 Claims, 6 Drawing Sheets

(51) Int. Cl.
    *H04L 41/40*         (2022.01)
    *H04L 41/5009*    (2022.01)
    *H04L 43/091*     (2022.01)
    *H04W 24/02*     (2009.01)

(56) References Cited

U.S. PATENT DOCUMENTS

| | | |
|---|---|---|
| 2019/0121687 A1 | 4/2019 | Masuda et al. |
| 2019/0138934 A1 | 5/2019 | Prakash et al. |
| 2021/0320878 A1* | 10/2021 | Young .................. H04L 47/808 |
| 2023/0019669 A1* | 1/2023 | Alabbasi .................. G06N 3/04 |
| 2023/0179638 A1* | 6/2023 | Hu .......................... H04L 63/20 726/1 |

OTHER PUBLICATIONS

"Study on enablers for network automation for the 5G System (5GS); Phase 2 (Release 17)"; 3GPP Standard Technical Report 23.700-91 V2.0.0; 3rd Generation Partnership Project; Nov. 30, 2020; 29 pgs.

Communication of and extended European Search Report issued in European Patent Application No. 21902378.5; mailed Apr. 12, 2024; 13 pgs.

Kaloxylos Alexandros, et al.; AI and ML—Enablers for Beyond 5G Networks; 5G PPP Technology Board, May 11, 2021; 5 pgs.

3rd Generation Partnership Project; Technical Specification Group Services and System Aspects; Study on enablers for network automation for the 5G System (5GS)3rd Generation Partnership Project; Technical Specification Group Services and System Aspects; Study on enablers for network automation for the 5G System (5GS); Phase 2, Release 17, 3GPP Standard, Technical Report; Nov. 30, 2020; 8 pgs.

* cited by examiner

OPERATION AND MAINTENANCE MANAGEMENT METHOD OF NETWORK SLICE SUBNET, APPARATUS, SYSTEM, DEVICE AND MEDIUM

CROSS-REFERENCE TO RELATED APPLICATIONS

The present application is the National Stage of International Application No. PCT/CN2021/132128, filed on Nov. 22, 2021, which claims priority to Chinese Patent Application No. 202011436423.X, filed on Dec. 7, 2020. The disclosures of the present application are incorporated herein by reference in their entireties.

TECHNICAL FIELD

The embodiment of the present application relates to the field of communication technology, in particular to an operation and maintenance management method of a network slice subnet, an apparatus, a system, a device and a medium.

BACKGROUND

The operation and maintenance management of the network slice is an important challenge for current 5G networks in application. When performing the operation and maintenance management of the network slice, the slice management system needs to translate the service level agreement (SLA) required for tenants into instantiated parameters and service parameters of the slice subnet in each domain of wireless, transmission and core networks, and the operation and maintenance management of the network slice and network slice subnet is completed in the slice management system.

Currently, when the slice management system performs operation and maintenance management on the slice (network slice subnet), it needs to obtain management data and service data from the physical site or the virtual network function (VNF) corresponding to the network function (NF) in the network slice subnet for analysis, and then performs the operation and maintenance management of the network slice subnet based on the analysis result.

However, a large amount of periodic data is obtained from the physical site or VNF corresponding to the NF, and the acquisition and processing of these data will greatly increase costs for the operation and maintenance management of the network slice subnet (such as costs of network bandwidth and data storage), and at the same time, the current optimization method of network slice subnet is still relied on the expert experience, and there is no effective means to improve the intelligent optimization of SLA of the network slice subnet.

SUMMARY

The embodiments of the present application provide an operation and maintenance management method of a network slice subnet, including: obtaining a performance analysis result of each network function (NF) in the network slice subnet, the performance analysis result is obtained by an analytical model in the NF, and the analytical model is obtained by multiple NFs and a common node based on federated learning; and performing operation and maintenance management on the network slice subnet based on the performance analysis result.

The embodiments of the present application provide an operation and maintenance management apparatus of a network slice subnet, including: an acquisition module configured for obtaining a performance analysis result of each network function (NF) in the network slice subnet, the performance analysis result is obtained by an analytical model in the NF, and the analytical model is obtained by multiple NFs and a common node based on federated learning; and a management module configured for performing operation and maintenance management on the network slice subnet based on the performance analysis result.

The embodiments of the present application provide an operation and maintenance management system of a network slice subnet, including a common node and multiple NFs belonging to the network slice subnet; the common node configured for: sending a model training task to each NF; performing model aggregation based on model parameters reported by each NF; sending the aggregated model parameters to each NF for iterative learning; obtaining a performance analysis result analyzed by an analytical model, the analytical model being obtained by the NF based on iterative learning; and performing operation and maintenance management on the network slice subnet based on the performance analysis result, the model training task includes a federated learning policy information, a machine learning algorithm information, and a subscription data information; each NF configured for: receiving the model training task sent by the common node; performing model training based on the model training task; reporting the model parameters obtained by training to the common node; receiving the model parameters sent by the common node; performing the iterative learning based on the sent model parameters; and obtaining the analytical model after reaching a preset number of iterations or a preset model accuracy.

The embodiments of the present application provide an electronic device, including: at least one processor; and a memory communicated with the at least one processor; where the memory stores instructions executable by the at least one processor, the instructions are executed by the at least one processor to enable the at least one processor to perform the operation and maintenance management method of the network slice subnet as mentioned above.

The embodiments of the present application provide a computer readable storage medium storing a computer program, the computer program, when executed by a processor, implements the operation and maintenance management method of the network slice subnet as mentioned above.

BRIEF DESCRIPTION OF THE DRAWINGS

One or more embodiments are illustrated exemplarily by the accompanying drawings corresponding thereto, and these exemplary illustrations do not constitute a limitation on the embodiments.

DETAILED DESCRIPTION OF THE EMBODIMENTS

In order to make the purpose, technical solutions and advantages of the embodiments of the present application clearer, each embodiment of the present application will be described in detail below in conjunction with the accompanying drawings. However, it will be understood by those skilled in the art that in each embodiment of the present application, many technical details are presented to enable the reader to better understand the present application. However, even without these technical details and various variations and modifications based on each of the following embodiments, the technical solutions protected by the present application can be realized. The following embodiments are divided for the convenience of description and shall not constitute any limitation to the specific manner of implementation of the present application, and each embodiment can be combined with each other without contradiction.

The main purpose of the embodiments of the present application is to propose an operation and maintenance management method of a network slice subnet, an apparatus, a system, a device and a medium, which can reduce the cost for operation and maintenance management of the network slice subnet.

The operation and maintenance management method of the network slice subnet proposed in the present application obtains a performance analysis result of each NF in the network slice subnet, and performs operation and maintenance management of the network slice subnet based on the performance analysis result, the performance analysis result is obtained by an analytical model of the NF, and the analytical model is obtained by multiple NFs and a common node based on federated learning. Because the federated learning is adopted, each NF can use its own model to analyze its own data, so when the operation and maintenance management of the network slice subnet is carried out, the network slice subnet management function (NSSMF) of the network slice subnet can directly obtain the analysis result from each physical site or VNF corresponding to the NF, without obtaining and processing a large amount of periodic data from the physical site or VNF, which reduces the demand for the network bandwidth, data storage, etc., and the reliance on professionals with expert experience can be reduced through the federated learning mechanism to learn and manage the operation and maintenance for the network slice subnet, to improve the optimization and intelligence of SLA of the network slice subnet, thus further to reduce the cost for the operation and maintenance management of the network slice subnet.

The first embodiment of the present application relates to an operation and maintenance management method of the network slice subnet, the method obtains a performance analysis result of each network function (NF) in a network slice subnet, where the performance analysis result is obtained by an analytical model in the NF, and the analytical model is obtained by multiple NFs and a common node based on federated learning; and performs operation and maintenance management on the network slice subnet based on the performance analysis result. Because the federated learning is adopted, each NF can use its own model to analyze its own data, so when the operation and maintenance management of the network slice subnet is carried out, the NSSMF of the network slice subnet can directly obtain the analysis result from each physical site or VNF corresponding to the NF, without obtaining and processing a large amount of periodic data from the physical site or VNF, which reduces the demand for the network bandwidth, data storage, etc., and the reliance on professionals with expert experience can be reduced through the federated learning mechanism to learn and manage the operation and maintenance for the network slice subnet, to improve the optimization and intelligence of SLA of the network slice subnet, thus further to reduce the cost for the operation and maintenance management of the network slice subnet.

It should be noted that the executive subject of the operation and maintenance management method of the network slice subnet provided by the embodiment of the present application can be a slice management system, specifically it can be the NSSMF entity on the radio access network (RAN) side, or the NSSMF entity on the core network (CN) side. It can be understood that the operation and maintenance management method of the network slice subnet is implemented through the NSSMF instead of through the network slice management function (NSMF), which can reduce the complexity of the operation and maintenance management process on the NSMF side and improve the timeliness of the operation and maintenance management of the slice, and the operation and maintenance management method of the network slice subnet is implemented through NSSMF, which can make the network slice subnet have automated management function and improve the intelligence level of the operation and maintenance management.

Figure 1:
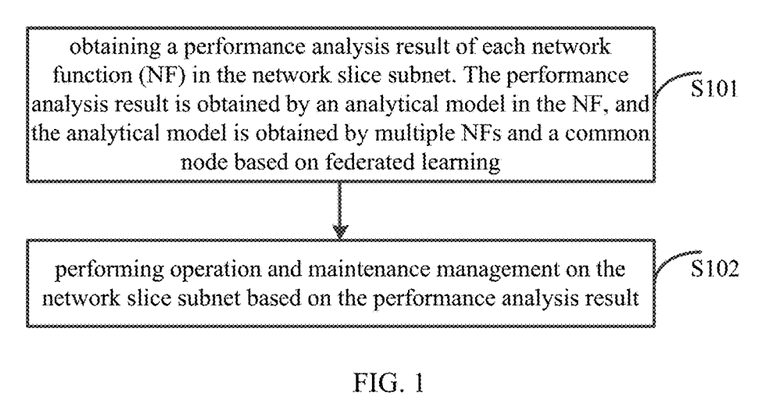
FIG. 1 is a flowchart of an operation and maintenance management method of a network slice subnet according to a first embodiment of the present application.

The specific process of the operation and maintenance management method of the network slice subnet provided by the embodiment of the present application is shown in FIG. 1, including:

S101: obtaining a performance analysis result of each network function (NF) in the network slice subnet. The performance analysis result is obtained by an analytical model in the NF, and the analytical model is obtained by multiple NFs and a common node based on federated learning.

The performance analysis result of the NF may include the analysis result of the operational performance of the NF itself or the performance influence result of the NF on the network slice subnet as a basis for the operation and maintenance management of the network slice subnet.

After the analytical model is obtained by the federated learning training, each NF can apply the obtained analytical model to analyze its own data to obtain its own performance analysis result. It should be understood that when using federated learning to train the analytical model, it can be some NFs in the network slice subnet and a common node to perform the federated learning, and other NFs that do not participate in federated learning can download the analytical model from the common node after the training is completed. In an embodiment, in order to make the sample data more adequate and the predicted result of the analytical model more accurate, it can be all the NFs in the network slice subnet and the common node for federated learning. The common node can be directly connected or indirectly connected to each NF, for example, it can be an element management (EM) directly connected to each NF, and the executive subject NSSMF obtains the performance analysis result of each NF from the EM. Since the EM does not necessarily act as an intermediate node between the NF and the common node on the management network, for example, on the core network side, each VNF element does not depend on the EM, and the VNF can then connect directly with the NSSMF, so the NSSMF can be selected as the common node.

It should be noted that since the same NF may belong to different network slice subnets, and different network slice subnets may contain different contents and be located in different environments, thus when the management method of the network slice subnet provided by the embodiment of the present application analyzes different network slice subnets, the performance analysis results obtained by the same NF in different network slice subnets may be different.

In an embodiment, before S101, i.e., before obtaining the performance analysis result of each NF in the network slice subnet, the method further includes:

using the common node to send a model training task to each NF, for each NF to perform model training based on the model training task and to report model parameters obtained by training to the common node, where the model training task includes a federated learning policy information, a machine learning algorithm information, and a subscription data information; and using the common node to perform model aggregation based on the reported model parameters; sending the aggregated model parameters to each NF for iterative learning; and obtaining the analytical model after reaching a preset model accuracy.

The federation learning policy may include: horizontal federation learning, vertical federation learning, or migration federation learning. The machine learning algorithm information can include data parallelism, model parallelism or graph parallelism, and iteration policy information (single iteration, echelon based iteration or hybrid iteration, etc.); and the subscription data information refers to what data the NF needs to subscribe to for model training, for example, whether to subscribe to data information such as measurement report (MR) or trace, etc..

In the embodiment, the NSSMF uses the common node to send the model training task to each NF in the network slice subnet, and the NF, after receiving the model training task, subscribes to relevant data based on the subscription data information in the model training task, and performs model training and inference based on the federated learning policy information and the machine learning algorithm information in the model training task, and reports the model parameters calculated by the model inference to the commode node. After the common node receives the reported model parameters, the NSSMF uses the common node to perform model aggregation based on the reported model parameters, and sends the aggregated model parameters to each NF for iterative learning, and obtains the analytical model after reaching a preset number of iterations or a preset model accuracy. The preset number of iterations or the preset model accuracy can be set according to actual needs, and no specific limitation is made here.

It should be understood that the model training task and the subscription data information can be set and changed according to the actual needs, and when the model training task and the subscription data information are changed, the updated analytical model and the updated performance analysis result can be obtained. In practical application, the model training task and subscription data information can be changed according to the performance analysis result and the needs of operation and maintenance management, so as to update or further optimize the analytical model and performance analysis result.

Figure 2:
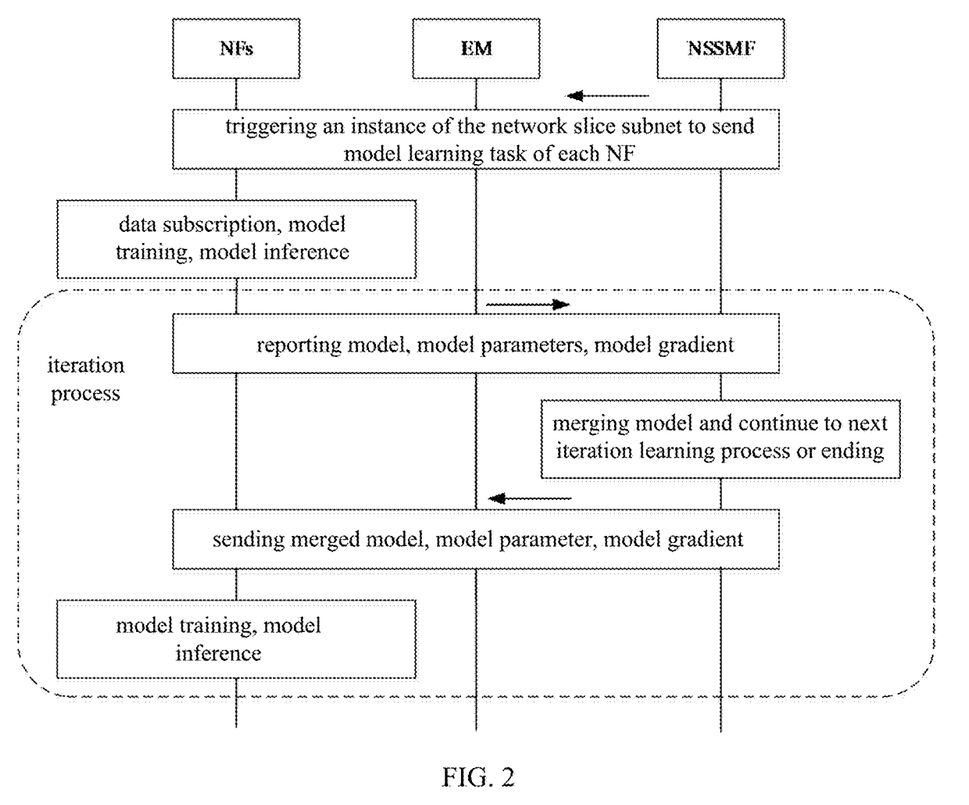
FIG. 2 is a flowchart of the operation and maintenance management method of the network slice subnet according to the first embodiment of the present application in performing federated learning.

Referring to FIG. 2, which shows a flowchart of the management method of the network slice subnet provided by the embodiment of the present application in performing federation learning. In FIG. 2, when NSSMF sends the model training task to each NF, it sends the model training task to EM first, and then EM sends the model training task to the NF. When the NF reports the model parameters to NSSMF, it sends the model parameters to the EM first, and then the EM transmits the model parameters to NSSMF. When NSSMF sends the merged model parameters to the NF, it also sends the merged model parameters to EM, then EM sends the subsumed model parameters to the NF; the other processes of FIG. 2 are basically the same as the above-mentioned processes, and will not be repeated here.

It should be understood that when the common node is NSSMF, using the common node to send model training task to each NF means that NSSMF directly sends the model training task to each NF, while using the common node to perform model aggregation based on the reported model parameters, etc. is in the same way.

S102: performing operation and maintenance management on the network slice subnet based on the performance analysis result.

In an embodiment, corresponding operation and maintenance management rules can be set for the performance analysis result, so that after obtaining the performance analysis result of each NF, the operation and maintenance management can be implemented based on the corresponding operation and maintenance management rules. For example, if the performance analysis result of the NF is the analysis result of the NF's own operation performance, the corresponding operation and maintenance management rule is to adjust the service parameters of the NF if the performance analysis result of the NF is poor, and the NSSMF, after obtaining the performance analysis result of each NF, adjusts the service parameters of the NF with poor performance analysis results based on the corresponding operation and maintenance management rule to improve the NF's own operation performance, to achieve the purpose of operation and maintenance management of each NF of the network slice subnet. For example, if the corresponding operation and maintenance management rule is to adjust the instantiated parameters of the NF if the proportion of the NFs with poor performance analysis results in the network slice subnet reaches 60%. The NSSMF, after obtaining the performance analysis result of each NF, adjusts the instantiated parameters of the NFs based on the operation and maintenance management rule if the proportion of the NFs with poor performance analysis results reaches 65% based on the statistics, to improve the corresponding instantiated templates of NF. The specific operation and maintenance management rules can be set according to actual needs, and no specific limitation is made here.

The management method of the network slice subnet provided by the embodiment of the present application obtains the performance analysis result of each NF in the network slice subnet, and performs operation and maintenance management of the network slice subnet based on the performance analysis result, where the performance analysis result is obtained by an analytical model of the NF, and the analytical model is obtained by multiple NFs and a common node based on federated learning. Because the federated learning is adopted, each NF can use its own model to analyze its own data, so when the operation and maintenance management of the network slice subnet is carried out, the NSSMF of the network slice subnet can directly obtain the analysis result from each physical site or VNF corresponding to the NF, without obtaining and processing a large amount of periodic data from the physical site or VNF, which reduces the demand for the network bandwidth, data storage, etc., and the reliance on professionals with expert experience can be reduced through the federated learning mechanism to learn and manage the operation and maintenance for the network slice subnet, to improve the optimization and intelligence of SLA of the network slice subnet, thus further to reduce the cost for the operation and maintenance management of the network slice subnet.

The second embodiment of the present application relates to an operation and maintenance management method of the network slice subnet, and the second embodiment is substantially the same as the first embodiment, with the main difference that: in the embodiment of the present application, the performance analysis result is a contribution degree of certain key performance indicators (e.g., KPI) of each NF to certain key performance indicators (e.g., KPI) of the network slice subnet, and accordingly, the operation and maintenance management rule of the network slice subnet based on the performance analysis result includes: determining a NF to be optimized based on the contribution degree, sending information of the NF to be optimized to a network function virtual orchestrator (NFVO) of the network slice subnet, for the NFVO to initiate an optimal deployment of an NF instance or a new creation of the NF instance to a virtual network function (VNFM) based on the information of the NF to be optimized.

Figure 3:
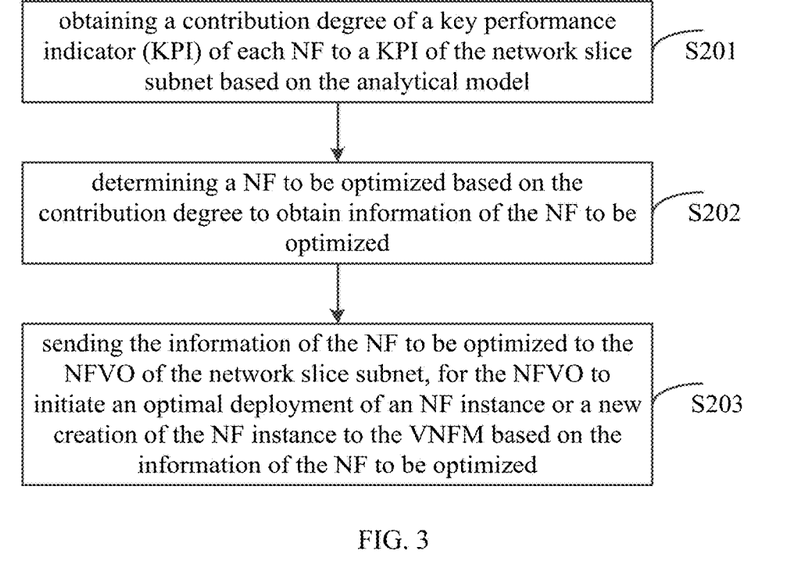
FIG. 3 is a flowchart of the operation and maintenance management method of the network slice subnet according to a second embodiment of the present application.

The specific process of the operation and maintenance management method of the network slice subnet provided by the embodiment of the present application is shown in FIG. 3, including:

S201: obtaining a contribution degree of certain key performance indicators (e.g., KPI) of each NF to certain key performance indicators (e.g., KPI) of the network slice subnet based on the analytical model.

When obtaining the contribution degree of certain key performance indicators (e.g., KPI) of each NF to certain key performance indicators (e.g., KPI) of the network slice subnet, KPIs that both the NF and the network slice subnet have can be selected, such as call delay, quality of service (Qos), number of users, etc. By obtaining the contribution degree of KPIs of each NF to the KPIs of the network slice subnet, the degree of influence of the NF on the SLA of the network slice subnet can be determined.

In an embodiment, the training process of the analytical model can be: the NSSMF initiates the model training task to the EM for that network slice subnet (specifically network slice subnet identification (NSSI)), and the EM, after receiving the model training task, performs task decomposition and initiates to the NF list in the same NSSI the model training task of the contribution degree of KPIs of NF to KPIs of the network slice subnet, and each NF, after receiving the model training task, subscribes data (e.g., MR, Trace, KPI, and other data) based on the subscription data information of the model training task, and then performs the model training and inference based on the federated learning policy information (e.g., horizontal federated learning) and the machine learning algorithm information (e.g., data parallelism) in the model training task, and reports the model parameters obtained by training to EM, the EM transmits the model parameters reported by NF to NSSMF. After finishing the collection of model parameters from each NF, NSSMF performs model aggregation (based on the model gradient descent method) to obtain the aggregated model, and the NSSMF sends the aggregated model (or model parameters) to each NF through EM for iterative learning, and after the number of iterations reaches a preset number or the aggregated model reaches a preset model accuracy, the analytical model is obtained.

S202: determining a NF to be optimized based on the contribution degree to obtain information of the NF to be optimized.

In an embodiment, the contribution degree can include a positive contribution degree and a negative contribution degree. It is understood that if the contribution degree of a NF is negative and deviates from the KPIs of the network slice subnet by a large amount (e.g. negative contribution degree of more than 30%), it is a "shortcoming" in the network slice subnet and needs to be optimized accordingly.

In an embodiment, a threshold of the contribution degree can be set, and if the contribution degree of the NF is negative and less than the threshold, the NF will be identified as the NF to be optimized, where the threshold of the contribution degree can be set according to the actual situation, without specific restrictions here.

After determining all the NFs to be optimized, the information of the NFs to be optimized can be obtained. In an embodiment, an NF optimization list can be formed based on all the NFs to be optimized, and the NF optimization list is used as the NF information to be optimized.

S203: sending the information of the NF to be optimized to the NFVO of the network slice subnet, for the NFVO to initiate an optimal deployment of an NF instance or a new creation of the NF instance to the VNFM based on the information of the NF to be optimized.

In an embodiment, the NFVO/VNFM may adjust the network slice subnet description (NSSD) or adjust the network service description file based on the NF information to be optimized, to achieve the purpose of optimal deployment of the NF instance.

When VNFM performs the optimal deployment of the NF instance or the new creation of the NF instance based on the NF information to be optimized, it can set corresponding operation and maintenance management rules for the NF information to be optimized, so that VNFM can implement the optimal deployment of the NF instance or the new creation of the NF instance based on the corresponding operation and maintenance management rule after obtaining the NF information to be optimized.

Figure 4:
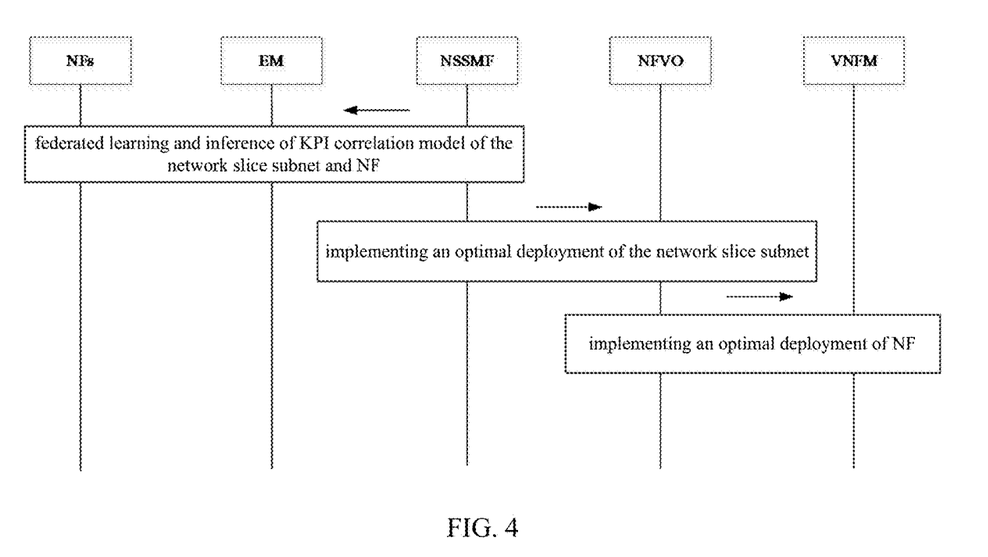
FIG. 4 is a flowchart of the operation and maintenance management method of the network slice subnet according to the second embodiment of the present application implemented on a radio access network (RAN) side.

Referring to FIG. 4, which shows a flowchart of the operation and maintenance management method of the network slice subnet provided by the embodiment of the present application implemented on the RAN side. Specifically, the NSSMF sends the model training task through the EM to each NF for federated learning to obtain an analytical model, and then obtains the contribution degree of the KPIs of each NF to the KPIs of the network slice subnet based on the analytical model, initiates an optimal deployment of the network slice subnet to the NFVO based on the obtained contribution degree, and the NFVO then initiates an optimal deployment of the NF to the VNFM for the optimal deployment of the NF instance or the new creation of the NF instance.

Figure 5:
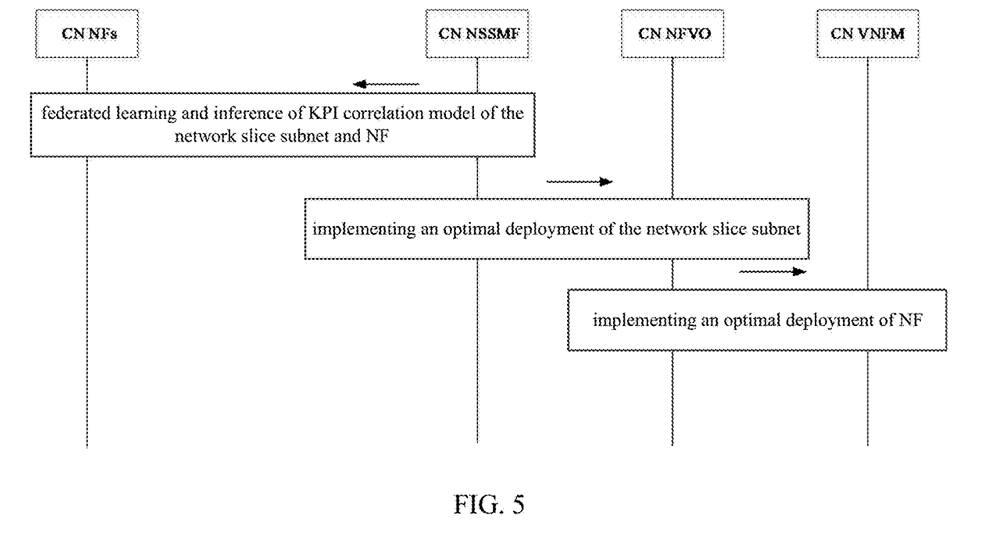
FIG. 5 is a flowchart of the operation and maintenance management method of the network slice subnet according to the second embodiment of the present application implemented on the core network (CN) side.

As mentioned earlier, the management method of the network slice subnet provided by the embodiment of the present application can also be applied to the CN side. Referring to FIG. 5, which is a flowchart of the operation and maintenance management method of the network slice subnet provided by the embodiment of the present application implemented on the CN side. Its specific flow is roughly the same as that of FIG. 4, with the difference that the NSSMF on the CN side is directly connected to the NF on the CN side and no longer connected through the EM.

The operation and maintenance management method of the network slice subnet provided by the embodiment of the present application obtains the contribution degree of the KPI of each NF to the KPI of the network slice subnet based on the analytical model, and takes the contribution degree as the performance analysis result to perform the optimal deployment of the NF instance or the new creation of the NF instance. Since the contribution degree of KPIs of NF to KPIs of network slice subnet can reflect the degree of influence of the NF on SLA of network slice subnet, the point to be optimized in network slice subnet can be determined based on the contribution degree, and then the optimal deployment and the new creation of the NF instance can be performed according to the corresponding problems, which can improve the overall performance of the network slice subnet and the efficiency of the operation and maintenance management of the network slice subnet.

The third embodiment of the present application involves an operation and maintenance management method of the network slice subnet, and the third embodiment is substantially the same as the first embodiment, with the main difference that: in the embodiment of the present application, the correlation relationship of the service parameters of each NF to certain key performance indicators (e.g., KPI, KQI) of the network slice subnet is taken as the performance analysis result; accordingly, performing the operation and maintenance management of the network slice subnet based on the performance analysis result includes: obtaining a correlation relationship of service parameters of each NF with certain key performance indicators (e.g., KPI, KQI) of the network slice subnet based on the analytical model; and taking the correlation relationship as the performance analysis result.

Figure 6:
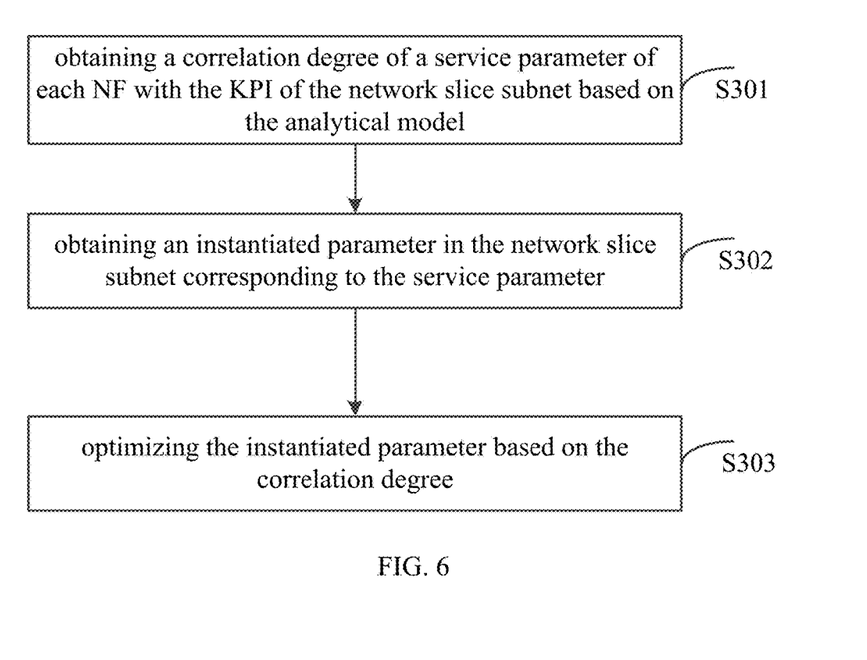
FIG. 6 is a flowchart of the operation and maintenance management method of the network slice subnet according to a third embodiment of the present application.

The specific process of the operation and maintenance management method of the network slice subnet provided by the embodiment of the present application is shown in FIG. 6, including:

S301: obtaining a correlation relationship of service parameters of each NF with certain key performance indicators (e.g., KPI, KQI) of the network slice subnet based on the analytical model.

When obtaining the correlation relationship of the service parameters of each NF to certain key performance indicators (e.g., KPI, KQI) of the network slice subnet, the service parameters that are more relevant to the KPIs of the network slice subnet can be selected, such as the cell selection algorithm, cell scenario, directional coverage parameters, cell power and other service parameters. By obtaining the correlation relationship of the service parameters of each NF with certain key performance indicators (e.g., KPI, KQI) of the network slice subnet, the degree of influence of the service parameters of the NF on the SLA of the network slice subnet can be determined.

In an embodiment, the training process of the analytical model can be: the NSSMF initiates the model training task to the EM for that NSSI, and the EM, after receiving the model training task, performs task decomposition and initiates to the NF list in the same NSSI the model training task of the contribution degree of certain key performance indicators (e.g., KPI) of NF to certain key performance indicators (e.g., KPI) of the network slice subnet, and each NF, after receiving the model training task, subscribes data (e.g., service parameters, MR, Trace, KPI, and other data) based on the subscription data information of the model training task, and then performs the model training and inference based on the federated learning policy information (e.g., horizontal federated learning) and the machine learning algorithm information (e.g., data parallelism) in the model training task, and reports the model parameters obtained by training to EM, the EM transmits the model parameters reported by NF to NSSMF. After finishing the collection of model parameters from each NF, NSSMF performs model aggregation (based on the model gradient descent method) to obtain the aggregated model, and the NSSMF sends the aggregated model (or model parameters) through EM to each NF for iterative learning, and after the number of iterations reaches a preset number or the aggregated model reaches a preset model accuracy, the analytical model is obtained.

In an embodiment, when training the analytical model, the service parameters can also be actively adjusted (e.g., raising or lowering the service parameters) to analyze whether the service parameters will significantly change the KPIs of the NFs after the adjustment, thereby providing a basis for modification of the service parameters when the service parameters need to be modified.

S302: obtaining instantiated parameters in the network slice subnet corresponding to the service parameters.

S303: optimizing the instantiated parameters based on the correlation relationship.

S302 and S303 are described together as follows:

After obtaining the correlation relationship of the service parameters of each NF with certain key performance indicators (e.g., KPI, KQI) of the network slice subnet, the NSSMF obtains the instantiated parameters corresponding to the service parameters, and then optimizes the instantiated parameters based on the correlation relationship, specifically, the NSSMF notifies the NFVO, then the NFVO initiates the modification of the instantiated parameters to the VNFM. When optimizing the instantiated parameters based on the correlation relationship degree, the operation and maintenance management rules for the instantiated parameters are also be set for the correlation relationship, so that the instantiated parameters can be optimized based on the corresponding operation and maintenance management rules after the correlation relationship is obtained.

Figure 7:
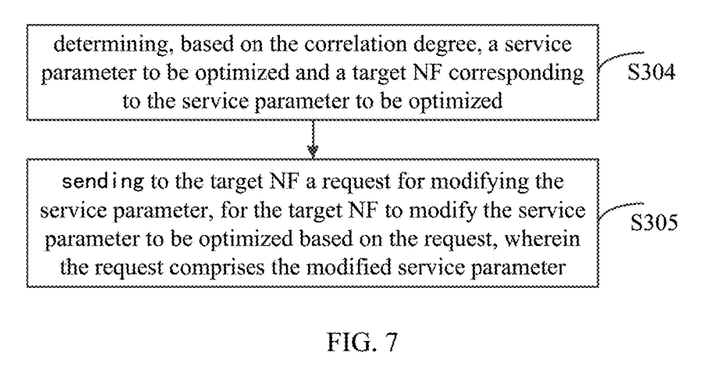
FIG. 7 is a flowchart of refining steps after S303 of the operation and maintenance management method of the network slice subnet according to the third embodiment of the present application.

In an embodiment, after S303, i.e., after optimizing the instantiated parameters based on the correlation relationship, as shown in FIG. 7, the method further includes:

S304: determining, based on the correlation relationship, service parameters to be optimized and a target NF corresponding to the service parameters to be optimized.

S305: sending to the target NF a request for modifying the service parameters, for the target NF to modify the service parameters to be optimized based on the request, wherein the request comprises the modified service parameters.

In the embodiment, the NSSMF determines the service parameters to be optimized and the target NF based on the correlation relationship, sends a request for modifying the service parameters to the target NF via EM, and the target NF, after receiving the request for modifying the service parameters, modifies the corresponding service parameters based on the modified service parameters in the request, thereby realizing the optimization of the service parameters.

Figure 8:
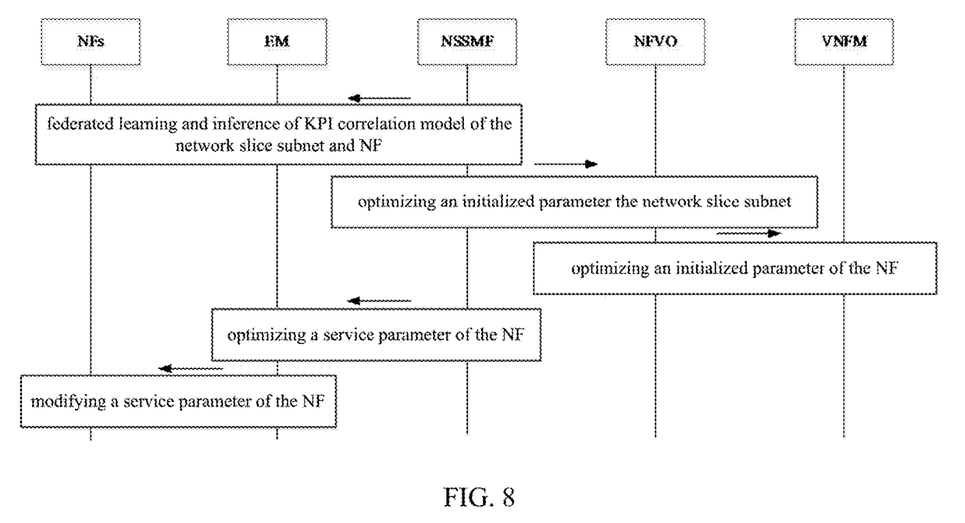
FIG. 8 is a flowchart of the operation and maintenance management method of the network slice subnet according to the third embodiment of the present application.

Referring to FIG. 8, which is a flowchart of the operation and maintenance management method of the network slice subnet provided by the embodiment of the present application. Specifically, the NSSMF sends the model training task through the EM to each NF for federated learning to obtain an analytical model, and then the correlation relationship of the service parameters of each NF with certain key performance indicators (e.g., KPI, KQI) of the network slice subnet is obtained based on the analytical model; the optimal deployment of the instantiated parameters of the network slice subnet is initiated through the NFVO to the VNFM based on the obtained correlation relationship; the NSSMF sends a request for modifying the service parameters to the target NF through the EM, and the target NF, after receiving the request, modifies the corresponding service parameters.

The operation and maintenance management method of the network slice subnet provided by the embodiment of the present application obtains the correlation relationship of the service parameters of each NF with certain key performance indicators (e.g., KPI, KQI) of the network slice subnet based on the analytical model, and takes the correlation relationship as the performance analysis result to optimize the instantiated parameters. Since the correlation relationship of the service parameters of the NF with certain key performance indicators (e.g., KPI, KQI) of the network slice subnet can reflect the degree of influence of the service parameters on the SLA of the network slice subnet, the instantiated parameters corresponding to the service parameters can be determined based on the correlation relationship, and then the instantiated parameters is optimized based on the correlation relationship, which can improve the overall performance of the network slice subnet and the efficiency of the operation and maintenance management of the network slice subnet.

In addition, those skilled in the art can understand that the division of steps in the above various methods is only for clear description, and the implementation can be combined into one step or split for certain steps and decomposed into multiple steps, which are all within the protection scope of the present application as long as they include the same logical relationship; adding insignificant modifications to or introducing insignificant designs in the algorithm or process, but not changing the algorithm and the core design of the process are within the scope of the present application.

Figure 9:
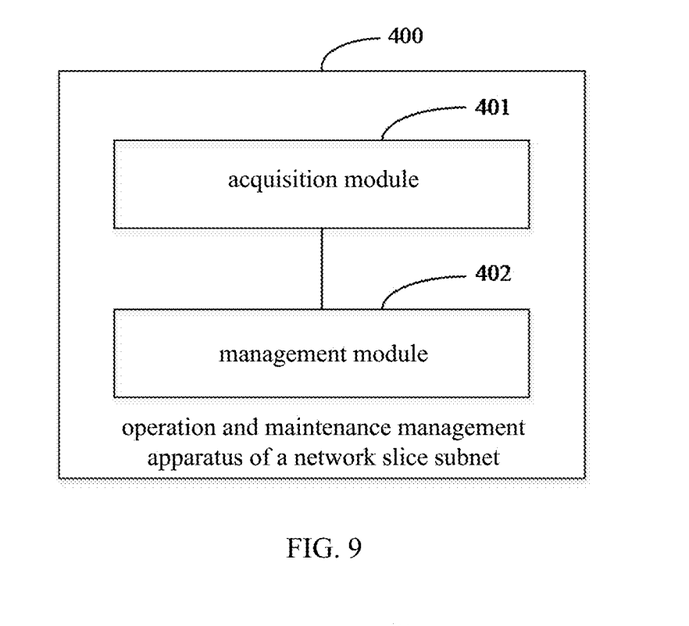
FIG. 9 is a schematic structural diagram of modules of an operation and maintenance management apparatus of a network slice subnet according to a fourth embodiment of the present application.

A fourth embodiment of the present application relates to an operation and maintenance management apparatus 400 of the network slice subnet, as shown in FIG. 9, including an acquisition module 401 and a management module 402, the functions of each module are described in detail as follows:

an acquisition module 401 configured for obtaining a performance analysis result of each network function (NF) in a network slice subnet, the performance analysis result is obtained by an analytical model in the NF, and the analytical model is obtained by multiple NFs and a common node based on federated learning;

a management module 402 configured for performing operation and maintenance management on the network slice subnet based on the performance analysis result.

The operation and maintenance management apparatus 400 of the network slice subnet provided in the embodiment of the present application further includes a training module, the training module is configured for:

using the common node to send a model training task to each NF, for each NF to perform model training based on the model training task and to report a model parameters obtained by training to the common node, the model training task includes a federated learning policy information, a machine learning algorithm information, and a subscription data information;

using the common node to perform model aggregation based on the reported model parameters; sending the aggregated model parameters to each NF for iterative learning; and obtaining the analytical model after reaching a preset number of iterations or a preset model accuracy.

In the embodiment, the acquisition module 401 is further configured for:

obtaining a contribution degree of certain key performance indicators (e.g., KPI) of each NF to certain key performance indicators (e.g., KPI) of the network slice subnet based on the analytical model; and taking the contribution degree as the performance analysis result.

In the embodiment, the management module 402 is further configured for:

determining a NF to be optimized based on the contribution degree to obtain information of the NF to be optimized; and sending the information of the NF to be optimized to a network function virtual orchestrator (NFVO) of the network slice subnet, for the NFVO to initiate an optimal deployment of an NF instance or a new creation of the NF instance to a virtual network function (VNFM) based on the information of the NF to be optimized.

In the embodiment, the acquisition module 401 is further configured for:

obtaining a correlation relationship of service parameters of each NF with certain key performance indicators (e.g., KPI, KQI) of the network slice subnet based on the analytical model; and taking the correlation relationship as the performance analysis result.

In the embodiment, the management module 402 is further configured for:

obtaining instantiated parameters in the network slice subnet corresponding to the service parameters; and optimizing the instantiated parameters based on the correlation relationship.

In the embodiment, the management module 402 is further configured for:

determining, based on the correlation relationship, service parameters to be optimized and a target NF corresponding to the service parameters to be optimized; and sending to the target NF a request for modifying the service parameters, for the target NF to modify the service parameters to be optimized based on the request, wherein the request comprises the modified service parameters.

In the embodiment, the common node is the NSSMF.

It is not difficult to find that the embodiment is an apparatus embodiment corresponding to the embodiment of the aforementioned method, and the embodiment can be implemented in conjunction with the embodiment of the aforementioned method with each other. The relevant technical details mentioned in the previous embodiment of the method are still valid in the present embodiment, and will not be repeated here in order to reduce repetition. Accordingly, the relevant technical details mentioned in the present embodiment can also be applied to the embodiment of the preceding method.

It is worth mentioning that each module involved in the embodiment is a logical module, and in practical applications, a logical unit can be a physical unit, or a part of a physical unit, or can be realized as a combination of multiple physical units. In addition, in order to highlight the innovative part of the present application, the units that are less closely related to solving the technical problems presented in the present application are not introduced in the embodiment, but this does not indicate that other units do not exist in the embodiment.

Figure 10:
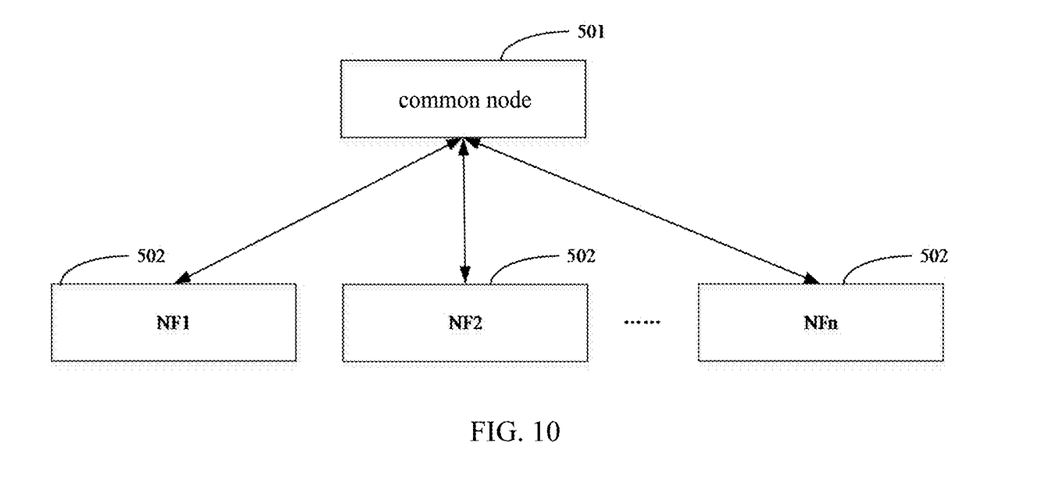
FIG. 10 is a schematic structural diagram of an operation and maintenance management system of a network slice subnet according to the fifth embodiment of the present application.

The fifth embodiment of the present application relates to an operation and maintenance management system of a network slice subnet, as shown in FIG. 10, including a common node 501 and multiple NFs 502 belonging to a network slice subnet;

the common node 501 is configured for sending a model training task to each NF 502; performing model aggregation based on model parameters reported by each NF 502; sending the aggregated model parameters to each NF 502 for iterative learning; obtaining a performance analysis result analyzed by an analytical model, the analytical model being obtained by the NF 502 based on iterative learning; and performing operation and maintenance management on the network slice subnet based on the performance analysis result, wherein the model training task comprises a federated learning policy information, a machine learning algorithm information, and a subscription data information;

NF502 is configured for receiving the model training task sent by the common node 501; performing model training based on the model training task; reporting the model parameters obtained by training to the common node 501; receiving the model parameters sent by the common node 501; performing the iterative learning based on the sent model parameters; and obtaining the analytical model after reaching a preset number of iterations or a preset model accuracy.

In the embodiment, the operation and maintenance management system of the network slice subnet further includes an EM;

NF502 is connected to EM through the OAM channel of the NF, and the EM is connected to the common node 501 through the NAF module of the EM.

Figure 11:
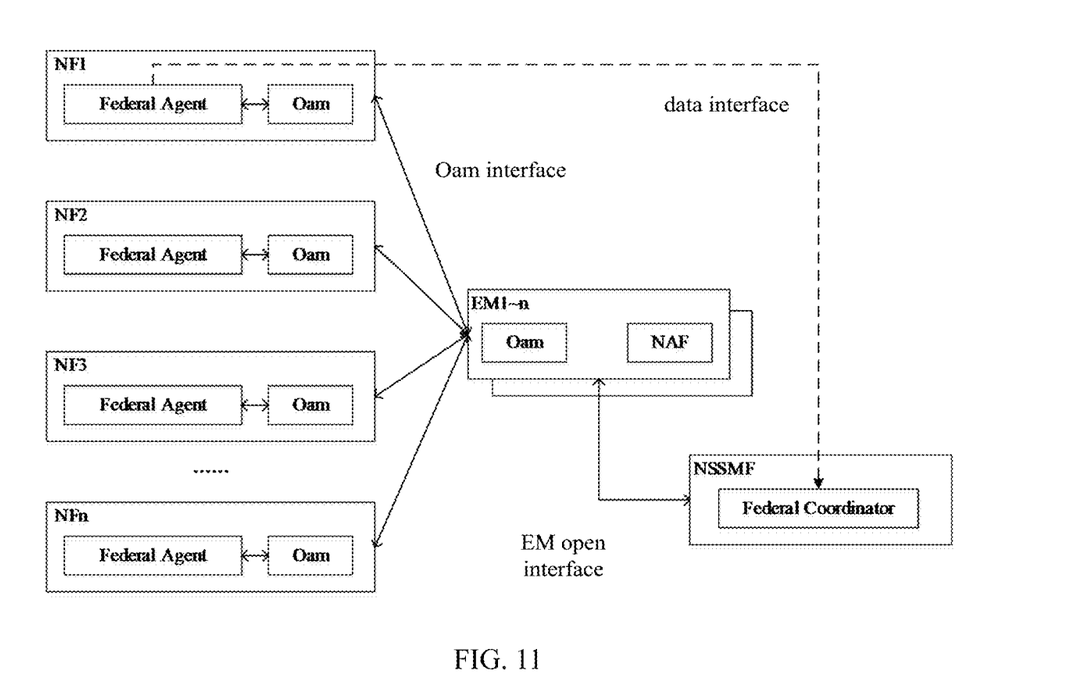
FIG. 11 is a schematic structural diagram of the operation and maintenance management system of the network slice subnet according to the fifth embodiment of the present application.

Referring to FIG. 11, which is a specific example diagram of the operation and maintenance management system of the network slice subnet provided in the embodiment of the present application. Specifically, each NF acts as a federal Agent of federated learning, while the common node 501 is the NSSMF, i.e., the NSSMF acts as a federal coordinator, and the EM, as an intermediate channel, can exist multiple instances to interact with the NF and the NSSMF, respectively, to help the NSSMF in information coordination and model aggregation. Regarding the operation and maintenance management system of the network slice subnet in FIG. 11, the following points need to be clarified:

1, The federated learning agent and coordinator modules, as optional functional modules, can be dynamically deployed as needed without affecting the existing NF and NSSMF management models and management capabilities.

2, The NF management model introduces model learning modeling to align the management model capabilities with the management capabilities of the NF such as alarm management, performance management, version management, security management, etc. When managing the model, model learning, training, inference and other parameters can be set based on model-driven approach.

3, NF interacts with EM to reuse the existing operation administration and maintenance (OAM) channel of NF and EM, the specific protocols of the OAM channel are various, such as NETCONF, RESTFUL, SNMPv3 or TLS and other protocols.

4, The internal of EM achieves model learning training northbound straight-through function through the NAF module, and provides open interfaces to the outside (such as RESTFUL interface).

5, The NSSMF realizes the data and control interaction between the NSSMF and the EM through the northbound open interface of the EM.

6, The capabilities of federal agent module are: ① the capability to support multiple machine learning algorithm, ② the capability to subscribe to multiple management data and network business data, ③ the capability to perform machine learning based on learning tasks, ④ the capability of model training and interference, outputting models, model parameters, and model gradients, ⑤ the capability to learn and reason based on model iterations, and ⑥ independent model transmission channels.

7, The capabilities of the federal coordinator module are: ① the ability to manage the model training and inference of NF, ② the ability to visualize the outputting model of the NF, ③ the ability to aggregate outputting model of the NF, ④ the ability to manage the iterative learning of the outputting model of the NF, and ⑤ the ability to independently collect the channel for the outputting model of the NF.

In the embodiment, the NF 502 uses distributed machine learning algorithms for model training.

In the embodiment, the common node 501 is further configured for:
    obtaining a contribution degree of certain key performance indicators (e.g., KPI) of each NF 502 to certain key performance indicators (e.g., KPI) of the network slice subnet based on the analytical model; and taking the contribution degree as the performance analysis result;
    determining a NF 502 to be optimized based on the contribution degree to obtain information of the NF to be optimized; and
    sending the information of the NF to be optimized to the NFVO of the network slice subnet, for the NFVO to initiate an optimal deployment of an NF instance or a new creation of the NF instance to the VNFM based on the information of the NF to be optimized.

In the embodiment, the common node 501 is further configured for:
    obtaining instantiated parameters in the network slice subnet corresponding to the service parameters; and
    optimizing the instantiated parameters based on the correlation relationship;

and/or,
determining, based on the correlation relationship, service parameters to be optimized and a target NF 502 corresponding to the service parameters to be optimized; and
sending to the target NF 502 a request for modifying the service parameters, for the target NF to modify the service parameters to be optimized based on the request, wherein the request comprises the modified service parameters.

It is not difficult to find that the embodiment is a system corresponding to the aforementioned method, and the embodiment can be implemented in conjunction with the embodiment of the aforementioned method with each other. The relevant technical details mentioned in embodiments of the previous method are still valid in this embodiment, so in order to reduce repetition, they are not repeated here. Accordingly, the relevant technical details mentioned in the embodiment can also be applied to the embodiments of the previous method.

Figure 12:
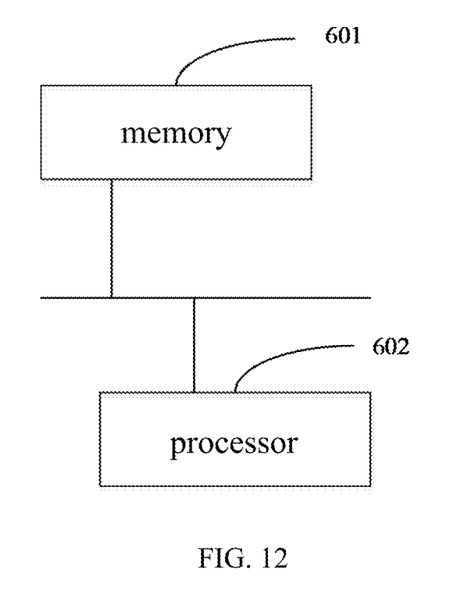
FIG. 12 is a schematic structural diagram of an electronic device according to a sixth embodiment of the present application.

A sixth embodiment of the present application relates to an electronic device, as shown in FIG. 12, including: at least one processor 601; and, a memory 602 communicated with the at least one processor 601. The memory 602 stores instructions executable by the at least one processor 601, the instructions are executed by the at least one processor 601 to enable the at least one processor 601 to execute the above operation and maintenance management method of the network slice subnet.

The memory and the processor are connected using a bus, and the bus may include any number of interconnected buses and bridges, and the bus connects various circuits of one or more processors and the memory together. The bus may also connect together various other circuits such as peripherals, voltage regulators, and power management circuits, which are well known in the art and therefore will not be further described herein. The bus interface provides an interface between the bus and the transceiver. The transceiver may be a single element or multiple elements, such as multiple receivers and transmitters, providing units for communicating with various other devices on a transmission medium. Data processed by the processor is transmitted over the wireless medium via an antenna, and further, the antenna also receives the data and transmits it to the processor.

The processor is responsible for managing the bus and the usual processing, and may also provide various functions including timing, peripheral interfaces, voltage regulation, power management, and other control functions, and the memory may be used to store data used by the processor in performing operations.

A seventh embodiment of the present application relates to a computer readable storage medium storing a computer program. The computer program implements the embodiment of the method described above when executed by the processor.

That is, it is understood by those skilled in the art that all or some of the steps in the method of the above embodiments can be accomplished by instructing the relevant hardware by means of a program stored in a storage medium including a number of instructions to cause a device (which may be a microcontroller, chip, etc.) or a processor to perform all or some of the steps of the method described in the various embodiments of the present application. The aforementioned storage medium includes: a USB flash drive, a mobile hard disk, a read-only memory (ROM), a random access memory (RAM), a disk or a CD-ROM, and other medium that can store program code.

Those skilled in the art can understand that each of the above embodiments is a specific embodiment to realize the present application, and in practical application, various changes can be made to it in form and details without deviating from the scope of the present application.

What is claimed is:

1. An operation and maintenance management method of a network slice subnet, comprising:
   obtaining a correlation relationship of multiple service parameters of each network function, NF, with certain key performance indicators of the network slice subnet based on an analytical model; and taking the correlation relationship as a performance analysis result, wherein the performance analysis result is obtained by the analytical model in the NF, and the analytical model is obtained by multiple NFs and a common node based on federated learning;
   obtaining multiple instantiated parameters in the network slice subnet corresponding to the multiple service parameters; and
   optimizing certain NFs with the multiple instantiated or service parameters based on the correlation relationship;
   wherein the correlation relationship of multiple service parameters of each NF with certain key performance indicators of the network slice subnet based on the analytical model, and taking the correlation relationship as the performance analysis result comprises:
   obtaining a contribution degree of certain key performance indicators of each NF to the certain key performance indicators of the network slice subnet and a relationship of some multiple service parameters of each NF with its certain key performance indicators based on the analytical model; and
   taking the contribution degree as the performance analysis result;
   wherein the optimizing certain NFs with the multiple instantiated or service parameters based on the correlation relationship comprises:
   determining a NF to be optimized based on the contribution degree to obtain information of the NF to be optimized; and
   sending the information of the NF to be optimized to a network function virtual orchestrator (NFVO) of the network slice subnet, for the NFVO to initiate an optimal deployment of an NF instance or a new creation of the NF instance to a virtual network function (VNFM) based on the information of the NF to be optimized.

2. The operation and maintenance management method of the network slice subnet according to claim 1, wherein before the obtaining the correlation relationship of multiple service parameters of each NF with the KPI of the network slice subnet based on the analytical model, and taking the correlation relationship as the performance analysis result, further comprises:
   using the common node to send a model training task to each NF, for each NF to perform model training based on the model training task and to report a model parameter obtained by training to the common node, wherein the model training task comprises a federated learning policy information, a machine learning algorithm information, and a subscription data information;
   using the common node to perform model aggregation based on the reported model parameter;
   sending the aggregated model parameters to each NF for iterative learning; and obtaining the analytical model after reaching a preset number of iterations or a preset model accuracy.

3. The operation and maintenance management method of the network slice subnet according to claim 1, wherein the optimizing certain NFs with the multiple instantiated or service parameters based on the correlation relationship comprises:

determining, based on the correlation relationship, the multiple service parameters to be optimized and a target NF corresponding to the multiple service parameters to be optimized; and sending to the target NF a request for modifying the service parameters, for the target NF to modify the multiple service parameters to be optimized based on the request, wherein the request comprises the modified multiple service parameters.

4. The operation and maintenance management method of the network slice subnet according to claim 1, wherein the common node is a network slice subnet management function (NSSMF).

5. An electronic device, comprising:

at least one processor; and a memory communicated with the at least one processor;

wherein the memory stores instructions executable by the at least one processor, the instructions are executed by the at least one processor to enable the at least one processor to perform the operation and maintenance management method of the network slice subnet comprising:

obtaining a correlation relationship of multiple service parameters of each network function, NF, with certain key performance indicators of the network slice subnet based on an analytical model; and taking the correlation relationship as a performance analysis result, wherein the performance analysis result is obtained by the analytical model in the NF, and the analytical model is obtained by multiple NFs and a common node based on federated learning;

obtaining certain NFs with multiple instantiated or service parameters in the network slice subnet corresponding to the multiple service parameters; and optimizing the multiple instantiated parameters based on the correlation relationship;

wherein the correlation relationship of multiple service parameters of each NF with the KPI of the network slice subnet based on the analytical model, and taking the correlation relationship as the performance analysis result comprises:

obtaining a contribution degree of certain key performance indicators of each NF to the certain key performance indicators of the network slice subnet based on the analytical model; and taking the contribution degree as the performance analysis result;

wherein the optimizing certain NFs with the multiple instantiated or service parameters based on the correlation relationship comprises:

determining a NF to be optimized based on the contribution degree to obtain information of the NF to be optimized; and sending the information of the NF to be optimized to a network function virtual orchestrator (NFVO) of the network slice subnet, for the NFVO to initiate an optimal deployment of an NF instance or a new creation of the NF instance to a virtual network function (VNFM) based on the information of the NF to be optimized.

6. A non-transitory computer readable storage medium storing a computer program, wherein the computer program, when executed by a processor, implements the operation and maintenance management method of the network slice subnet comprising:

obtaining a correlation relationship of multiple service parameters of each network function, NF, with certain key performance indicators of the network slice subnet based on an analytical model; and taking the correlation relationship as a performance analysis result, wherein the performance analysis result is obtained by the analytical model in the NF, and the analytical model is obtained by multiple NFs and a common node based on federated learning;

obtaining multiple instantiated parameters in the network slice subnet corresponding to the multiple service parameters; and optimizing certain NFs with the multiple instantiated or service parameters based on the correlation relationship;

wherein the correlation relationship of multiple service parameters of each NF with the KPI of the network slice subnet based on the analytical model, and taking the correlation relationship as the performance analysis result comprises:

obtaining a contribution of certain key performance indicators of each NF to the certain key performance indicators of the network slice subnet based on the analytical model; and taking the contribution degree as the performance analysis result;

wherein the optimizing the multiple instantiated parameters based on the correlation relationship comprises:

determining a NF to be optimized based on the contribution degree to obtain information of the NF to be optimized; and sending the information of the NF to be optimized to a network function virtual orchestrator (NFVO) of the network slice subnet, for the NFVO to initiate an optimal deployment of an NF instance or a new creation of the NF instance to a virtual network function (VNFM) based on the information of the NF to be optimized.

* * * * *